United States Patent [19]
Wilson et al.

[11] Patent Number: 4,548,787
[45] Date of Patent: Oct. 22, 1985

[54] AQUEOUS LIQUIDS CONTAINING METAL CAVITATION-EROSION CORROSION INHIBITORS

[75] Inventors: Joe C. Wilson, Woodhaven; Stanley T. Hirozawa, Birmingham; John J. Conville, Canton, all of Mich.

[73] Assignee: BASF Wyandotte Corporation, Wyandotte, Mich.

[21] Appl. No.: 465,193

[22] Filed: Feb. 9, 1983

Related U.S. Application Data

[63] Continuation of Ser. No. 315,319, Oct. 26, 1981, abandoned.

[51] Int. Cl.⁴ .................. C23F 11/16; C23F 11/18; C02F 5/10
[52] U.S. Cl. .................. 422/15; 210/697; 210/698; 252/175; 252/181; 252/389 A; 252/396; 422/16; 422/18; 422/19
[58] Field of Search ............. 252/175, 181, 389 A, 252/396; 422/15, 16, 18, 19; 210/697, 698

[56] References Cited

U.S. PATENT DOCUMENTS

| | | | |
|---|---|---|---|
| 2,147,395 | 2/1939 | Bayes | 252/5 |
| 2,147,409 | 2/1939 | Lamprey | 252/5 |
| 3,030,308 | 4/1962 | Agnew et al. | 252/74 |
| 4,217,216 | 8/1980 | Lipinski | 210/58 |

OTHER PUBLICATIONS

Rao et al., *Prevention of Cavitation Damage of Aluminum by Corrosion Inhibitors and Cathodic Protection*, J. Electrochem. Soc. India 23-1, 1974.

*Primary Examiner*—Michael R. Lusignan
*Attorney, Agent, or Firm*—David L. Hedden; Joseph D. Michaels

[57] ABSTRACT

Compositions for inhibiting mineral scale and the corrosion of metals particularly the cavitation corrosion of aluminum in the presence of aqueous liquids are disclosed. The combination of a water-soluble phosphate with at least one of a water-soluble molybdate, tungstate, or selenate is disclosed as providing a synergistic protective effect against the cavitation corrosion of aluminum in aqueous liquids.

18 Claims, No Drawings

AQUEOUS LIQUIDS CONTAINING METAL CAVITATION-EROSION CORROSION INHIBITORS

This is a continuation of application Ser. No. 315,319, filed Oct. 26, 1981, now abandoned.

BACKGROUND OF THE INVENTION

1. Field of the Invention

This invention relates to the inhibition of cavitation-erosion corrosion of aluminum and the corrosion of other metals exposed to an aqueous liquid.

2. Description of the Prior Art

The cavitation erosion-corrosion of aluminum water pumps upon exposure to aqueous systems such as water-cooled internal combustion engine coolants is a relatively new development. While alkali metal molybdates and the soluble salts of tungstic and selenic acids have been used in antifreeze compositions to prevent the corrosion of metals, particularly cast iron, when used in an automobile cooling system, there is no indication in the prior art that soluble salts of molybdic, tungstic and selenic acids act to retard the corrosion of aluminum, particularly the cavitation erosion-corrosion of aluminum water pumps.

Agnew et al in U.S. Pat. No. 3,030,308 disclose an antifreeze composition consisting essentially of a water-soluble liquid alcohol, magnesium metaborate, and an alkali metal molybdate. The antifreeze composition is said to act synergisticly to retard the corrosion of cast iron when used in an automobile cooling system.

Lamprey in U.S. Pat. No. 2,147,409 and Bayes in U.S. Pat. No. 2,147,395 disclose antifreeze compositions comprising an alcohol and a soluble salt of an acid selected from the group consisting of tungstic, selenic and molybdic acids.

SUMMARY OF THE INVENTION

It has been found that water-soluble salts of an acid selected from the group consisting of molybdic, tungstic and selenic acids in combination with a water-soluble phosphate provide a synergistic improvement in the retardation of the cavitation erosion-corrosion of aluminum water pumps in contact with aqueous liquids, particularly aqueous antifreeze compositions containing a water-soluble alcohol freezing point depressant. When said phosphate and water-soluble salt of molybdic, tungstic or selenic acid is combined with conventional corrosion inhibitors, a water treatment composition results which is useful in the preparation of an antifreeze concentrate or an antifreeze composition suitable for use as a heat transfer medium, particularly for use as a heat transfer medium in a water-cooled internal combustion engine.

DETAILED DESCRIPTION OF THE INVENTION

This invention relates to a means of inhibiting the cavitation-erosion corrosion of aluminum water pumps in contact with an aqueous system. Specific embodiments of the invention are the use of a combination of corrosion inhibitors in an antifreeze or antifreeze concentrate or other heat transfer composition, particularly for use in the cooling system of an internal combustion engine. In practice, antifreeze concentrates are utilized by dilution with water in a quantity sufficient to lower the freezing point of the final solution to the desired temperature.

Unexpectedly it has been found that a synergistic combination of inhibitors is effective in preventing cavitation-erosion corrosion of aluminum water pumps in aqueous liquids wherein the aqueous liquid comprises, in parts by weight, based upon 100 parts by weight of the aqueous liquid, generally from about:

A. 0.001 to 0.5 parts by weight per 100 parts by weight of said aqueous system of a water-soluble molybdate, tungstate, or selenate including the alkali metal and alkaline earth metal molybdate, tungstate, or selenate salts, the ammonium molybdate, tungstate, or selenate and various mixtures thereof, preferably about 0.005 to about 0.10 parts by weight, and most preferably about 0.01 to about 0.05 parts by weight is used, B. 0.5 to about 2 parts by weight per 100 parts by weight of said aqueous liquid of a water-soluble phosphate including water-soluble alkali metal or ammonium salts of orthophosphoric acid, pyrophosphoric acid and metaphosphoric acid as well as esters of phosphorus acids such as the mono-, di-, and tri-esters of orthophosphoric acid which can be alkyl or aryl substituted aryl or alkyl esters of orthophosphoric acid, preferably about 0.8 to about 1.8 parts by weight, most preferably about 1.0 to about 1.5 parts by weight is used, and C. about 0.1 to about 0.6 parts by weight per 100 parts by weight of said aqueous liquid of a siloxane-silicate copolymer including the phosphonate siloxane-silicate copolymers, the sulfonate siloxane-silicate copolymers, and various mixtures thereof. Preferably about 0.15 to about 0.5 parts by weight, most preferably about 0.2 to about 0.4 parts by weight is used.

The above synergistic combination of inhibitors is particularly suited for the corrosion protection of aluminum in contact with an aqueous system so as to provide protection against cavitation-erosion corrosion of aluminum water pumps. Where other metals are in contact with the aqueous system in addition to aluminum, other corrosion inhibitors are optionally added to the aqueous liquid. Such components as water-soluble nitrate ion and water-soluble azole compounds can be used where said aqueous system contains in addition to aluminum, metals such as copper, brass and iron. The source of nitrate ion can be any water-soluble nitrate such as the alkali metal nitrates.

The azole compound which is optionally used in aqueous systems of the invention where it is desired to protect copper and brass from corrosion is selected from among the water-soluble triazoles, pyrazoles, imidazoles, isooxazoles, isothiazoles, thiazoles, thiadiazole salts, and the like. Generally, the alkali metal salts are used. Specific preferred azole compounds include 1,2,3-benzotriazole; 1,2,3-tolyltriazole; sodium 2-mercaptobenzothiazole; and sodium 2-mercaptobenzimidazole. Generally, the azole compound is used in amounts of about 0.1 parts to about 0.5 parts by weight, preferably about 0.2 to about 0.4 parts by weight, based on 100 parts by weight of the aqueous liquid.

The synergistic combination of corrosion inhibitors useful in inhibiting the cavitation-erosion corrosion of aluminum water pumps is generally effective in a basic aqueous corrosive media. For instance, the corrosion inhibitors of the invention are useful in aqueous alcohol-based antifreeze compositions which are generally maintained at a pH of at least 6, preferably about 7 to about 11. The corrosion inhibitors of the invention are also useful in heat transfer media utilized in cooling towers.

The water-soluble molybdate which is preferred for use in the aqueous systems of the present invention can be any salt of molybdic acid which is readily soluble in water. These include both alkali metal and alkaline earth metal molybdates as well as ammonium molybdate, the term "alkali molybdate" being used in a broad sense so as to include alkali metal, alkaline earth metal and ammonium molybdates. Examples of useful molybdates are sodium molybdate, potassium molybdate, lithium molybdate and ammonium molybdates including ammonium dimolybdate and ammonium heptamolybdate. Of the foregoing alkali molybdate compounds, sodium molybdate and potassium molybdate are preferred because of their availability and compatibility with the aqueous system as well as for economic reasons. As indicated above, the molybdate ion is employed in amounts so as to provide a concentration in the aqueous system of at least about 0.001 parts by weight per 100 parts by weight of aqueous liquid. Preferably about 0.005 to about 0.1 parts by weight per 100 parts by weight of molybdate based upon said aqueous liquid are employed. The specific concentration of the molybdate ion will vary depending upon the degree of hardness of the aqueous system, the temperature, and the amount of dissolved oxygen in the aqueous system. While concentrations of the molybdate ion above about 0.5 parts by weight per 100 parts by weight of aqueous liquid can be employed, in most instances concentrations of molybdate ion above this limit normally do not provide significant improvements in the inhibitive characteristics of the aqueous system and are undesirable for economic reasons.

Both inorganic and organic water-soluble phosphorus compounds are useful in inhibiting the cavitation-erosion corrosion of aluminum in contact with aqueous liquids. The water-soluble phosphates are used generally in amounts so as to provide a concentration of about 0.5 to about 2 parts by weight per 100 parts by weight of the aqueous liquid. These compounds include the preferred water-soluble alkali metal salts of orthophosphoric acid, pyrophosphoric acid, and metaphosphoric acid. Orthophosphoric acid being tri-basic forms three series of salts, the primary, illustrated by potassium dihydrogen phosphate, the secondary, illustrated by disodium hydrogen phosphate, and the tertiary, illustrated by trisodium phosphate. Useful organic phosphates include the oxy esters of phosphoric acid, as well as the amides and triesters thereof. Useful dibasic acid esters of phosphoric acid include those derived from sebacic, adipic, and azelaic acids. The most common phosphorus acid esters which are useful are the mono-, di-, and tri-esters of orthophosphoric acid. These can be alkyl phosphates, aryl phosphates and mixed alkyl-aryl phosphates. Representative alkyl groups having 1 to about 18 carbon atoms which can be present in the alkyl phosphates include methyl, ethyl, propyl, isopropyl and n-butyl, isobutyl, etc. Representative substituted alkyl groups which can be present in the phosphorus esters include said alkyl groups substituted with halogen, especially chlorine and fluorine, and with alkoxy groups. Examples of substituted alkyl groups include butoxyethyl, 2-chloroethyl, 2-fluoroethyl, etc. Examples of other groups which can be present in the phosphorus esters include alkyl groups substituted with halogen, especially chlorine and fluorine, and with alkoxy groups. Examples of substituted alkyl groups include butyoxyethyl, 2-chloroethyl, 2-fluoroethyl, etc. Examples of aryl groups which can be present in the phosphorus esters include phenyl, xylyl, cresyl and halogenated phenyl.

Where the aqueous liquids contact other metals in addition to aluminum, including aluminum water pumps, metal salt corrosion inhibitors, preferably alkali metal salts known in the prior art can be usefully added to the aqueous liquids of the invention. Such known corrosion inhibitors include the water-soluble nitrates, nitrites, silicates, carbonates, for instance, sodium silicate, sodium nitrate, potassium carbonate, ammonium silicate.

The phosphonate and sulfonate siloxane-silicate copolymers can be formed in situ upon combination of a water-soluble silicate and a water-soluble siloxane in an aqueous system at ambient temperature. These copolymers are believed to provide improved metal corrosion inhibition over the use of the water-soluble silicates. Said copolymers substantially inhibit the gelation tendency of a water-soluble silicate at a pH of about 7 to about 11. Thus the anticorrosive activity of the soluble silicate is maintained in the copolymer as compared to an ordinary soluble silicate such as sodium silicate. Other siloxane-silicate copolymers can be utilized in combination with the water-soluble molybdates and the water-soluble salts and esters of phosphorus acids. These are disclosed in U.S. Pat. Nos. 3,341,469; 3,337,496; 3,312,622; 3,198,820; 3,203,969; and 3,248,329, all incorporated herein by reference.

The silyl alkyl esters of phosphorus which are useful in the aqueous liquids of the invention are disclosed in U.S. Pat. No. 4,093,641. Their use as corrosion inhibitors in aqueous liquids is disclosed in German Offenlegunsschrift No. 2,912,430. The use of the silyl hydrocarbyl esters of sulfur as corrosion inhibitors for metals in contact with aqueous liquids is disclosed in copending U.S. patent application Ser. No. 249,916, filed Apr. 1, 1981, and Ser. No. 250,050, filed Apr. 1, 1981. Both the above-referenced patents and the above-referenced patent applications are incorporated herein by reference.

The antifreeze concentrates of the invention are prepared by first dissolving in a water-alcohol blend (preferably ethylene glycol in combination with diethylene glycol) a water-soluble silicate, an organosiloxane, preferably a phosphonate siloxane or a sulfonate siloxane, and an alkali metal molybdate, tungstate or selenate. Subsequently the composition is rendered basic by the addition of sodium or potassium hydroxide. Where protection against the corrosion of copper and copper-containing alloys is also required in addition to aluminum in contact with the aqueous antifreeze concentrates of the invention, an alkali metal azole such as potassium mercaptobenozthiazole or sodium tolyltriazole is then generally added as a 50 percent aqueous solution. Optionally, an antifoam agent is used which can be a low-foaming polyoxyethylene adduct of a polyoxypropylene hydrophobic base having a molecular weight of about 1750 wherein the oxyethylene content is about 10 weight percent of the molecule. Additional low-foaming nonionic surface active agents can be used which are disclosed in U.S. Pat. Nos. 3,340,309; 3,504,041; 3,770,701; and 2,425,755. The disclosures of low-foaming nonionic surface active agents in the above-mentioned U.S. patents are incorporated herein by reference. The resultant antifreeze concentrate composition can be diluted with water in accordance with prior art practice to produce an antifreeze fluid or heat transfer medium having the desired freezing point. As a general rule, the antifreeze concentrate used to prepare the coolant can be diluted with about 1 to about 3 volumes of water to arrive at the coolant fluid which is circulated in said engine cooling system or in a cooling tower. Smaller or larger quantities of water can be added as necessary to avoid the freezing of the coolant.

In order to obtain the desired resistance to cavitation-erosion corrosion of aluminum water pumps in contact with aqueous liquids containing a siloxane-silicate copolymer metal corrosion inhibitor, it is necessary to provide the required amounts of phosphate and at least one of a molybdate, tungstate, or selenate in the amounts specified above. For this purpose, no alternative to the use of phosphate, molybdate, tungstate or selenate has been found.

The freezing point depressant utilized in the antifreeze compositions of the invention can be any suitable water-soluble liquid alcohol used heretofore in formulating antifreeze compositions. The water-soluble alcohol contains 1 to about 4 carbon atoms and 1 to about 3 hydroxy groups. Ethylene glycol is preferred as the freezing point depressant and especially the commercially available mixtures containing largely ethylene glycol and a small amount of diethylene glycol. The commercial mixture generally contains at least 85 to 95 percent by weight of ethylene glycol with the remainder being diethylene glycol and small amounts of substances which are incidentally present such as water. Other water-soluble liquid alcohols can be admixed with ethylene glycol but such mixtures usually are not preferred. Inexpensive commercially available water-soluble alcohols can also be used such as methyl, ethyl, propyl, and isopropyl alcohol alone or in mixtures.

In evaluating the cavitation-erosion corrosion performance of aluminum pumps in the presence of engine coolants, ASTM D 2809-77 standard test method was utilized and is incorporated herein by reference.

The following examples illustrate the various aspects of the invention but are not intended to limit its scope. Where not otherwise specified throughout this specification and claims, temperatures are given in degrees centigrade and parts, percentages, and proportions are by weight.

EXAMPLE 1

(control-forming no part of this invention)

An antifreeze concentrate was prepared from a commercial mixture of ethylene glycol containing about 5 percent by weight of diethylene glycol. The antifreeze concentrate contained 93.86 parts by weight of said commercial mixture of ethylene glycol, 1 part by weight of disodium hydrogen phosphate, 0.4 parts by weight of disodium silicate containing 5 molecules of water of hydration, 0.7 parts by weight of sodium nitrate, 0.5 parts by weight of a 50 percent aqueous solution of sodium mercaptobenzothiazole, 0.2 parts by weight of sodium nitrite, 0.5 parts by weight of borax, 0.2 parts by weight of a 50 percent by weight aqueous solution of sodium tolyltriazole, 2.57 parts by weight of water, and 0.04 parts by weight of a phosphonate siloxane having the formula:

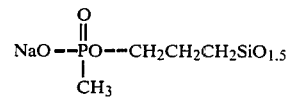

The antifreeze concentrate was prepared by successive addition of each solid component. The separate mixture of solid materials was then added to the ethylene glycol and after stirring thoroughly, the pH was determined. After insuring that the pH was between 9 and 10, sodium mercaptobenzothiazole (50 percent aqueous) was added. Lastly, an antifoam agent was added in the amount of 0.03 parts. The phosphonate siloxane and disodium silicate react to form in situ a siloxane-silicate copolymer. The antifoam agent is characterized as a polyoxyethylene adduct of a polyoxypropylene hydrophobic base having a molecular weight of about 1750 wherein the oxyethylene content is about 10 weight percent of the molecule.

EXAMPLE 2

The formula and procedure of Example 1 was repeated except that there was added 0.25 parts by weight of sodium molybdate.

EXAMPLE 3

The procedure and proportions of Example 1 was repeated except that there was added 0.05 parts by weight of sodium molybdate.

EXAMPLE 4

(control-forming no part of this invention)

An antifreeze concentrate was prepared from a commercial mixture of ethylene glycol which contains about 5 percent by weight diethylene glycol. The antifreeze concentrate contained 94.6 parts by weight of said commercial mixture of ethylene glycol, 1.5 parts by weight of disodium hydrogen phosphate, 0.4 parts by weight of sodium silicate, 0.5 parts by weight of sodium nitrate, 0.5 parts by weight of a 50 percent by weight aqueous solution of sodium mercaptobenzothiazole, 2.58 parts by weight of water, 0.02 parts by weight of the phosphonate siloxane utilized in Example 1, and 0.03 parts by weight of the antifoam agent utilized in Example 1. A separate mixture of solid materials was prepared. The separate mixture of solid materials was then added to the ethylene glycol and, after stirring thoroughly, the pH was determined. After insuring that the pH was between 9 and 10, the sodium mercaptobenzothiazole (50 percent aqueous) was added. Lastly, the antifoam agent was added.

EXAMPLE 5

The procedure of Example 4 was repeated. The antifreeze concentrate contained 94.46 parts by weight of the commercial mixture of ethylene glycol utilized in Example 1, 1.5 parts by weight of disodium hydrogen phosphate, 0.4 parts by weight of sodium silicate, 0.5 parts by weight of sodium nitrate, 0.01 parts by weight of sodium molybdate, 0.5 parts by weight of a 50 percent by weight aqueous solution of sodium mercaptobenzothiazole, 0.02 parts by weight of the phosphonate siloxane utilized in Example 1, and 0.03 parts by weight of the antifoam agent utilized in Example 1.

Evaluation of the antifreeze concentrates utilized in Examples 1 through 5 utilizing the ASTM D-2809-77 standard test method for the evaluation of cavitation-erosion corrosion characteristics of aluminum pumps in the presence of engine coolants resulted in the test results provided in the following Tables I and II showing pump, impeller and pump cover ratings after respectively 300 hours and 1000 hours.

TABLE I

CAVITATION-EROSION CORROSION OF ALUMINUM WATER PUMP EVALUATED BY ASTM D-2809-77 TEST METHOD AFTER 300 HOURS

| | Example | | | | |
|---|---|---|---|---|---|
| | 1 (control) | 2 | 3 | 4 (control) | 5 |
| Pump | 8.0 | 10 | 10 | 9.5 | 9.5 |
| Impeller | 4.5 | 10 | 10 | 9.0 | 9.5 |
| Pump Cover | 7.0 | 10 | 10 | 9.5 | 9.5 |

TABLE II

CAVITATION-EROSION CORROSION OF ALUMINUM WATER PUMP EVALUATED BY ASTM D-2809-77 TEST METHOD AFTER 1000 HOURS

| | Example | | | | |
|---|---|---|---|---|---|
| | 1 (control) | 2 | 3 | 4 (control) | 5 |
| Pump | 7.5 | 10 | 7 | 7.5 | 9.5 |
| Impeller | 4.0 | 7.5 | 7 | 5 | 9 |
| Pump Cover | 7.0 | 9.0 | 7.5 | 7 | 9.5 |

While this invention has been described with reference to certain specific embodiments, it will be recognized by those skilled in this art that many variations are possible without departing from the scope and spirit of the invention and that it will be understood that it is intended to cover all changes and modifications of the invention disclosed herein for the purposes of illustration which do not constitute departure from the spirit and scope of the invention.

The embodiments of the invention in which an exclusive privilege or property is claimed are defined as follows.

1. A composition for inhibiting mineral scale and the corrosion of metals in the presence of an aqueous liquid and particularly the cavitation-erosion corrosion of aluminum comprising parts based on 100 parts by weight of said aqueous liquid from about:
   (A) 0.5 to 2 parts by weight of a water-soluble hydrogen phosphate,
   (B) 0.001 to 0.5 parts by weight of a water-soluble molybdate, tungstate, or selenate, and
   (C) 0.1 to 0.8 parts by weight of a siloxane-silicate copolymer.

2. The composition of claim 1 additionally comprising in parts based on 100 parts by weight of said aqueous liquid
   (A) 0.1 to 0.5 parts by weight of an azole and
   (B) 0.2 to 0.8 parts by weight of a water-soluble nitrate.

3. The composition of claim 2 wherein said molybdate, tungstate, and selenate are alkali metal or ammonium salts thereof.

4. The composition of claim 3 wherein said water-soluble phosphate and nitrate are alkali metal salts thereof.

5. The composition of claim 4 wherein said azole is selected from at least one of the group mercaptobenzothiazole and tolyltriazole.

6. The composition of claim 5 wherein said mercaptobenzothiazole and tolyltriazole are alkali metal salts.

7. The composition of claim 6 wherein said siloxane-silicate copolymer is at least one of the group selected from phosphonate siloxane-silicate and sulfonate siloxane-silicate copolymers.

8. A corrosion inhibiting alcohol-based antifreeze concentrate adapted to inhibit the corrosion of metals in contact with aqueous liquids, especially cavitation-erosion corrosion of aluminum, comprising a water-miscible glycol, 0.001 to 0.50 parts by weight of a water-soluble molybdate, tungstate, or selenate, and metal corrosion inhibiting amounts of a siloxane-silicate copolymer, water-soluble nitrate, water-soluble azole, and a water-soluble hydrogen phosphate.

9. The concentrate of claim 8 wherein said nitrate, azole and phosphate are alkali metal salts and said water-miscible glycol has from 1 to 4 carbon atoms and from 1 to 3 hydroxy groups.

10. The concentrate of claim 9 wherein said azole is selected from at least one of the group consisting of an alkali metal mercaptobenzothiozole and an alkali metal tolyltriazole and said water-miscible glycol comprises ethylene glycol.

11. The concentrate of claim 10 wherein said molybdate is an alkali metal molybdate and said siloxane-silicate copolymer is selected from at least one of the group consisting of a phosphonate siloxane-silicate and a sulfonate siloxane-silicate copolymer.

12. A process for inhibiting mineral scale and corrosion of metal in the presence of aqueous liquids and especially for inhibiting cavitation-erosion corrosion of aluminum comprising adding to said aqueous liquid the following parts based upon 100 parts by weight of said aqueous liquid from about:
   (A) 0.5 to 2 parts by weight of a water-soluble hydrogen phosphate,
   (B) 0.001 to 0.50 parts by weight of a water-soluble molybdate, tungstate, or selenate, and
   (C) a 0.1 part to 0.8 parts by weight of a siloxane-silicate copolymer.

13. The process of claim 12 additionally comprising in parts based on 100 parts by weight of said aqueous system
   (A) 0.1 to 0.50 parts by weight of an azole and
   (B) 0.2 to 0.8 parts by weight of a water-soluble nitrate.

14. The process of claim 13 wherein said molybdate, tungstate, and selenate are alkali metal salts thereof.

15. The process of claim 14 wherein said water-soluble hydrogen phosphate and nitrate are alkali metal salts thereof.

16. The process of claim 15 wherein said azole is at least one of the group selected from mercaptobenzothiazole and tolyltriazole.

17. The process of claim 16 wherein said mercaptobenzothiazole and tolyltriazole are alkali metal salts.

18. The process of claim 17 wherein said siloxane-silicate copolymer is at least one of the group selected from phosphonate siloxane-silicate and sulfonate siloxane-silicate copolymers.

* * * * *